July 29, 1969 — J. INFANTE — 3,458,188
DANCE BELTS WITH DETACHABLE ELASTIC JOINING MEMBERS
Filed Oct. 24, 1967 — 2 Sheets-Sheet 1
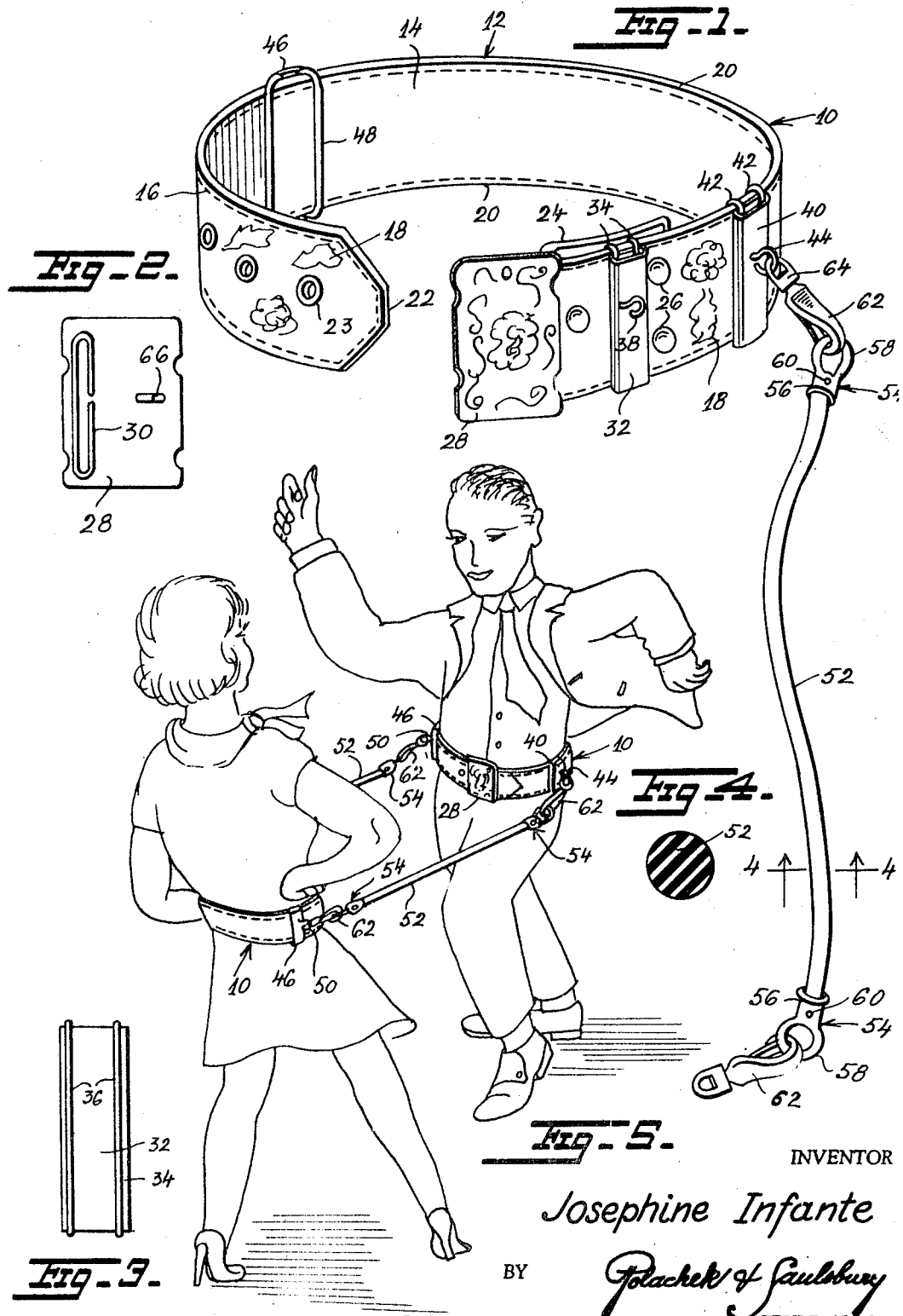
INVENTOR
Josephine Infante
BY Polachek & Saulsbury
ATTORNEYS July 29, 1969          J. INFANTE          3,458,188
DANCE BELTS WITH DETACHABLE ELASTIC JOINING MEMBERS
Filed Oct. 24, 1967          2 Sheets-Sheet 2
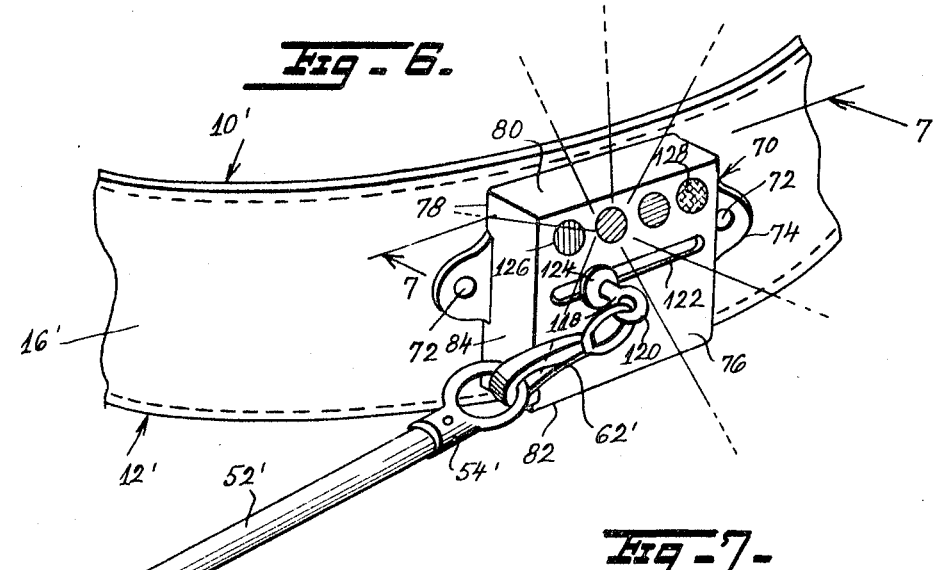
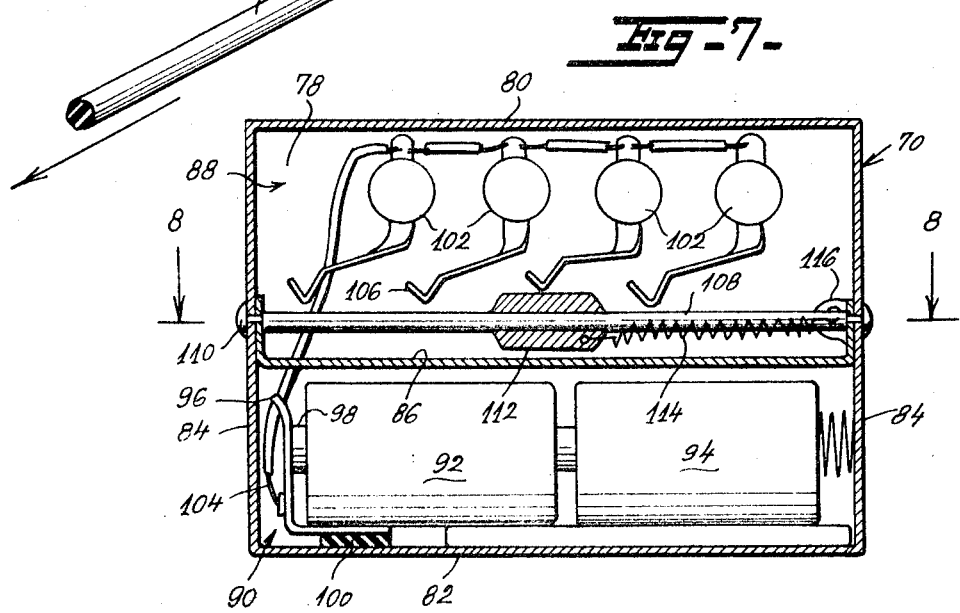
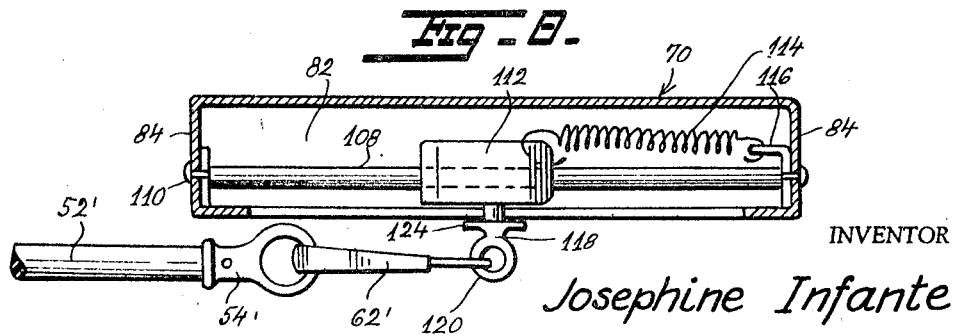
INVENTOR
Josephine Infante

United States Patent Office 3,458,188
Patented July 29, 1969

3,458,188
DANCE BELTS WITH DETACHABLE ELASTIC JOINING MEMBERS
Josephine Infante, 47 President St., Brooklyn, N.Y. 11231
Filed Oct. 24, 1967, Ser. No. 677,674
Int. Cl. A63g 31/00; E06c 1/16; A63b 27/00
U.S. Cl. 272—1                              10 Claims

ABSTRACT OF THE DISCLOSURE

A dance belt having means for joining to another belt of similar construction so that the wearers of the belts may dance face to face as a team. The joining means includes elongated elastic members with hook devices for releasable attachment to the belts around the wearers. The joining means may include a casing having an array of colored signal light devices which are progressively actuated in correspondence to the tension developed in the joining means.

---

This invention relates to belts and more particularly to a dance belt.

A principal object of the present invention is to provide a belt with means for joining to another belt of similar construction so that the wearers of the belt may dance as a team.

Another object is to provide a belt with elongated elastic means for joining two belts together leaving room for the wearers of the belt to dance face to face.

For further comprehension of the invention and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a belt embodying the invention.

FIG. 2 is a rear view of the buckle.

FIG. 3 is a rear view of a transverse mounting plate.

FIG. 4 is a cross-sectional view taken on the line 4—4 of FIG. 1.

FIG. 5 is a view of a male and female team joined by a belt embodying the invention and shown dancing.

FIG. 6 is a perspective view of a fragment of a belt embodying a modified form of the invention.

FIG. 7 is a sectional view taken on the line 7—7 of FIG. 6, and

FIG. 8 is a horizontal sectional view taken on the line 8—8 of FIG. 7.

Referring now in detail to the various views of the drawings, in FIG. 1 a belt embodying one form of the invention is shown and designated generally at 10. The belt 10 comprises a broad rectangular shaped body 12 of two-ply fabric material, the inner ply 14 preferably being of a silk nature and the outer ply 16 preferably having an outer surface decorated with flower designs as indicated at 18. The body has straight elongated edges 20, 20 and at one end is tapered to a blunt point 22. The tapered end is formed with a series of aligned spaced holes finished off with eyelets 23. At its other end, the body of the belt is turned over upon itself forming a loop 24 secured to the body by rivets 26. A metal plate or buckle 28 is hingedly connected to the looped end of the belt by means of a wire loop 30 secured to the inner surface adjacent one long edge of the plate and extending through the loop 24. The outer surface of the buckle is preferably ornamented.

In accordance with the invention, a narrow rectangular metal plate 32 is slidably mounted on the body of the belt transversely thereof closely spaced from the hinged plate or buckle 28, by means of spaced wire loops 34 extending through loops 36 formed along the long edges of the plate 32 and extending around and across the body of the belt. The plate 32 mounts a metal hook 38 midway its ends. Another narrow rectangular metal plate 40 constructed similarly to plate 32 is similarly slidably mounted by means of wire loops 42, similar to loop 34, on the belt body, at a point closely spaced from the loop 24. A metal hook 44 is mounted on plate 40 midway its ends.

A third narrow rectangular metal plate 46 is slidably mounted on the body of the belt transversely thereof, remote from the tapered end of the body, which plate 46 is constructed and slidably mounted similar to the plates 32 and 40 including the wire loops 48. Plate 46 also mounts a metal hook 50 similar to hooks 38 and 44.

An elongated elastic belt member 52, round in cross-section, is provided for selective attachment to either of the transverse plates 32 or 40 but is shown attached to plate 40. On each end of the body of the belt member 52, there is a bearing member 54 having a socket portion 56 at one end and a ring portion 58 at its other end. A pin 60 secures the bearing member on the end of the belt member. A conventional elongated hook 62 is shown pivotally and removably attached to each ring portion 58 and carries a ring 64 swivelly connected thereto at its other end. The ring 64 at one end of the belt member 52 is shown hooked over the hook 44 on plate 40.

In use, the belt 10 is placed around the waist of the wearer as shown in FIG. 5 and is fastened in place by means of a hook 66 on the inner surface of the buckle 28 removably inserted through one of the eyelets 23 of the belt body and interlocked with the eyelet. A belt 10 is worn by each of two dancing partners and the belt member 52 on the belt 10 of one partner is hooked at its other end onto the hook 50 on the transverse plate 46 on the belt on the other partner whereby one side of the belts 10, 10 worn by the partners is connected to each other. The belt member 52 of the other partner is then similarly hooked on the transverse plate 46 of said one partner whereby both sides of the belt are connected together as shown in FIG. 5. The dimensions of the belt members 52 are such that sufficient space is afforded between the partners and this together with the elasticity of the material of the belt members permit all kinds of dance steps during the dance. The plates 40 and 46 may be slid along the body of the belt to adjust the distance between the partners.

In FIG. 6, a modified form of dance belt 10′ is shown. The body 12′ of the belt is similar in construction to body 12 of belt 10. However, in place of the transverse plates 32, 40 and 46 of belt 10 a metal casing or housing 70 is secured to the body 12′ of the belt 10′ remote from the looped end of the body and remote from the tapered end of the body, on the outer ply 16′ thereof by rivets 72 passing through perforated ears 74 on the sides of the casing. The casing is formed with a front wall 76, rear wall 78, top wall 80, bottom wall 82 and side walls 84, 84. A central partition wall 86 divides the interior of the casing into an upper compartment 88 and a bottom compartment 90. A pair of electric batteries 92 and 94 is operatively connected to each other and to the casing. A spring metal contact 96 contacts the central terminal 98 of battery 92 and is insulated from the casing 70 by an insulating strip 100.

A series of lamp bulbs 102 is suitably mounted on the rear wall of the casing and insulated therefrom. The lamp bulbs are connected in series with the central terminal of the batteries by means of a conductor 104 connected at one end to the contact 96 and at its other end connected to one terminal of the lamp bulbs. Spring metal wiping contacts 106 are connected to the other terminal of the lamp bulbs. A round metal rod 108 extends lengthwise of the casing above the partition wall 86 and is fastened therein at its ends by bolts 110 threaded into the axial ends thereof. A metal block 112 is slidably mounted on the rod 108 and serves as a sliding electric contact for the other terminal of the batteries. A compression spring 114 has one end anchored to a perforated lug 116 on one of the side walls 84 and its other end is fastened to one end of the block 112 for pulling said block toward said side wall. The shank portion 118 of an eyelet 120 has one end fastened to one side of block 112 its other end passing through an elongated slot 122 in the front wall 76 of the casing. The shank carries an annular flange 124 therearound outside the front wall. The front wall 76 is formed with a series of spaced aligned round windows 126, the windows being covered with translucent plastic sheet material of various colors as indicated at 128.

In use, the hook 62′ connected to the bearing member 54′ on one end of a belt member 52′ is hooked into the eyelet 120 and when the belts are worn by the dancing partners, the belt members will be pulled in one direction to the left as viewed in FIG. 6 by the bodily movements of the dancers and when pressure is released will be moved in the opposite direction by the springs 114 so that the block 112 is being pulled under and across the wiping contacts 106 on the lamp bulbs 102 so that the lamp bulbs flick on and off during the dance, and the windows being of different colors, present a pleasing and exciting appearance during the dance.

While I have illustrated and described the preferred embodiments of my invention it is to be understood that I do not limit myself to the precise construction herein disclosed and that various changes and modifications may be made within the scope of the invention as defined in the appended claims.

What is claimed is:

1. In combination, a pair of dance belts, each belt comprising an elongated rectangular shaped fabric body looped at one end and tapered at its other end, a rectangular buckle hingedly mounted on the looped end of the body, the tapered end having spaced aligned holes therein for selectively receiving a hook carried by the buckle, and a device on the body adjacent each end thereof for removably attaching an elongated elastic member; and a pair of elongated elastic members, each round in crosss-section, and each detachably attached at one end to one of said devices on one belt and detachably attached at the other end to one of said devices on the other belt.

2. In the combination as defined in claim 1, wherein the device for removably attaching an elongated elastic member includes an elongated rectangular shaped metal plate extending across the outside of the body of the belt and slidable therealong and a hook protruding from said plate to connect detachably the end of the elastic belt member.

3. In the combination as defined in claim 2, wherein the metal plate is provided with a pair of wire loops for encircling the body of the belt and sliding along the body for adjusting the position of the plate on the body of the belt.

4. In the combination as defined in claim 2, wherein each elongated elastic member has a bearing member mounted at each end thereof, an elongated hook having one end connected pivotally to each bearing member, and a ring swivelly mounted on the other end of the elongated hook for detachable connection to the hook on the rectangular shaped metal plate.

5. In the combination as defined in claim 2, wherein an additional elongated rectangular shaped metal plate is slidably mounted on the body of each belt adjacent the looped end thereof for selectively attaching the elongated elastic member to the body of the belt.

6. In the combination as defined in claim 1, wherein the hinge mounting of the buckle includes a wire loop secured to the inner surface of the body of the buckle adjacent one long edge thereof and extending through the looped end of the body of the belt.

7. In the combination as defined in claim 1, wherein the outer surface of the body and the outer surface of the buckle are decorated with ornaments.

8. In the combination as defined in claim 1 wherein the device for removably attaching an elongated elastic belt member includes a hollow casing with a series of colored windows, lamp bulbs behind the windows and a source of electric motive force operatively connected to the lampbulbs, a spring pressed metal block slidably mounted inside the casing and adapted to be interposed selectively between the source of electric motive force and each lamp for closing the circuit to the lamp, and means for sliding said block.

9. In the combination as defined in claim 8 wherein the casing has a front wall with an elongated slot therein and wherein the block is slidably mounted on an elongated rod, an eyelet having a shank portion extending through the slot in the front wall and secured to the block, wherein the elongated elastic belt member is adapted to engage the eyelet and pull the same in one direction when the belt is worn in a dance, the spring adapted to pull the eyelet in the opposite direction when pressure is released.

10. In the combination as defined in claim 8, wherein the source of electric motive force is constituted by a pair of electric battteries operatively connected to each other, a metal contact connected to the central terminal of the batteries, a conductor interposed between the metal contact and one terminal of the lamp bulbs, said lamp bulbs having wiping contacts connnected to the other terminal of the bulb, said wiping contacts being disposed in the path of sliding movement of the block, said block connected to the other terminal of the batteries, whereby upon engagement of the block with the wiping contacts the respective lamp bulbs become illuminated.

References Cited

UNITED STATES PATENTS

| 936,006 | 10/1909 | Matzner | 182—4 |
| 2,937,023 | 5/1960 | Seymour et al. | 272—80 |
| 3,110,497 | 11/1963 | Broman et al. | 272—57 X |
| 3,184,883 | 5/1965 | McCook | 272—82 X |
| 3,379,439 | 4/1968 | Sorenson et al. | 272—24 X |

FOREIGN PATENTS

| 43,032 | 9/1930 | Denmark. |
| 451,516 | 8/1936 | Great Britain. |
| 660,484 | 2/1964 | Italy. |

ANTON O. OECHSLE, Primary Examiner

ARNOLD W. KRAMER, Assistant Examiner

U.S. Cl. X.R.

2—312; 24—3, 186, 206; 46—228; 182—4; 224—26; 272—80; 273—1